US008695902B2

(12) United States Patent
Mayher

(10) Patent No.: US 8,695,902 B2
(45) **Date of Patent: *Apr. 15, 2014**

(54) WATER SPRINKLER

(75) Inventor: Joseph E. Mayher, Chillicothe, IL (US)

(73) Assignee: Robert Bosch GmbH, Stuttgart (DE)

( * ) Notice: Subject to any disclaimer, the term of this patent is extended or adjusted under 35 U.S.C. 154(b) by 861 days.

This patent is subject to a terminal disclaimer.

(21) Appl. No.: 12/718,368

(22) Filed: Mar. 5, 2010

(65) Prior Publication Data

US 2011/0215168 A1 Sep. 8, 2011

(51) Int. Cl.

| | |
|---|---|
| ***B05B 1/00*** | (2006.01) |
| ***A01G 27/00*** | (2006.01) |
| ***B05B 3/06*** | (2006.01) |
| ***B05B 3/00*** | (2006.01) |

(52) U.S. Cl.
USPC ........... 239/600; 239/70; 239/255; 239/263.3

(58) Field of Classification Search
USPC .......... 239/67, 70, 225.1, 251, 255, 242, 237, 239/600, 240, 261, 263, 263.3
See application file for complete search history.

(56) References Cited

U.S. PATENT DOCUMENTS

| | | | | |
|---|---|---|---|---|
| 2,660,472 | A | 11/1953 | Rice | |
| 3,567,122 | A | 3/1971 | Congdon et al. | |
| 3,865,138 | A * | 2/1975 | Jones | 137/624.12 |
| 4,023,585 | A * | 5/1977 | VandenBurg | 137/80 |
| 4,061,893 | A * | 12/1977 | Sanner | 200/38 D |
| 4,335,852 | A | 6/1982 | Chow | |
| 4,625,914 | A | 12/1986 | Sexton et al. | |
| 5,098,020 | A * | 3/1992 | Cooper et al. | 239/230 |
| 5,135,168 | A * | 8/1992 | Wang | 239/70 |
| 5,350,115 | A * | 9/1994 | Burnworth et al. | 239/242 |
| 5,845,850 | A * | 12/1998 | Guo | 239/242 |
| 5,938,122 | A * | 8/1999 | Heren et al. | 239/242 |
| 7,494,071 | B2 | 2/2009 | Baird | |
| 2002/0130204 | A1 | 9/2002 | Chao | |
| 2010/0012749 | A1 | 1/2010 | Barzuza | |

FOREIGN PATENT DOCUMENTS

WO 9532806 A1 12/1995

OTHER PUBLICATIONS

PCT Search Report in corresponding PCT Application (i.e., PCT/US2011/027436), mailed Jun. 6, 2011 (4 pages).

* cited by examiner

*Primary Examiner* — Justin Jonaitis
(74) *Attorney, Agent, or Firm* — Maginot, Moore & Beck

(57) ABSTRACT

A water sprinkler includes a base defining a first cavity and an outflow opening, a conduit assembly positioned in said first cavity and defining a first channel and a second channel, and said first channel defining a first channel inlet and a first channel outlet, and further said second channel defining a second channel inlet and a second channel outlet, and a timer mechanism having a timer inlet and a timer outlet, said timer mechanism being configured to operate in (i) a first mode in which fluid is allowed to pass between said timer inlet and said timer outlet, and (ii) a second mode in which fluid is prevented from passing between said timer inlet and said timer outlet, wherein said first channel outlet is positioned in fluid communication with said timer inlet, wherein said second channel inlet is positioned in fluid communication with said timer outlet, and wherein said base and said conduit assembly are configured so that fluid advancing through the water sprinkler must pass through both (i) said second channel outlet, and (ii) said outflow opening.

20 Claims, 5 Drawing Sheets

WATER SPRINKLER

FIELD

The present disclosure relates generally to water sprinklers.

BACKGROUND

Water sprinklers are used to distribute water within a spray area, such as a lawn. There are numerous forms of water sprinklers, including stationary, rotary, and oscillating varieties. Water sprinklers are fluidly coupled to a water supply through a water supply conduit, such as a garden hose. Stationary water sprinklers distribute water through a stationary water distributor, such as a spray tube or other spray member. The spray tube includes numerous nozzles, each of which are positioned to eject a stream of water onto a region within the spray area. The size of the spray area is determined, in part, by the number of nozzles on the spray tube and the pressure of the water supply to which the water sprinkler is coupled. Rotary and oscillating water sprinklers include a water distributor that rotates or oscillates in order to distribute water within a greater area than would otherwise be possible with a stationary spray tube. The flow of the water supply provided to a rotary and an oscillating sprinkler is used to drive a water motor which moves the water distributor.

Typically, in response to being fluidly coupled to a water supply, water sprinklers begin to distribute water through the distributor. Some water sprinklers, however, include a timer for controlling the flow of water through the distributor. In an "on" position the timer enables water to flow from the water supply to the distributor. In an "off" position the timer prevents water from flowing to the distributor. The timer is configured to remain in the "on" position for a predetermined time period. At the expiration of the predetermined time period the timer enters the "off" position to stop the flow of water to the distributor.

There is a continuing need in the art to provide a water sprinkler that is less complicated to manufacture.

SUMMARY

In accordance with one embodiment of the present disclosure, there is provided a water sprinkler that includes a base defining a first cavity and an outflow opening, a conduit assembly positioned in said first cavity and defining a first channel and a second channel, and said first channel defining a first channel inlet and a first channel outlet, and further said second channel defining a second channel inlet and a second channel outlet, and a timer mechanism having a timer inlet and a timer outlet, said timer mechanism being configured to operate in (i) a first mode in which fluid is allowed to pass between said timer inlet and said timer outlet, and (ii) a second mode in which fluid is prevented from passing between said timer inlet and said timer outlet, wherein said first channel outlet is positioned in fluid communication with said timer inlet, wherein said second channel inlet is positioned in fluid communication with said timer outlet, and wherein said base and said conduit assembly are configured so that fluid advancing through the water sprinkler must pass through both (i) said second channel outlet, and (ii) said outflow opening.

In accordance with another embodiment, a water sprinkler is provided that includes a base having a base outlet structure defining an outflow opening, said base further defining an inflow opening and a timer opening, a conduit assembly supported by said base and defining a first channel and a second channel, said first channel defining a first channel inlet and a first channel outlet, and said second channel defining a second channel inlet and a second channel outlet, and a timer mechanism extending through said timer opening and having a timer inlet and a timer outlet, said timer mechanism being configured to operate in (i) a first mode in which fluid is allowed to pass between said timer inlet and said timer outlet, and (ii) a second mode in which fluid is prevented from passing between said timer inlet and said timer outlet, wherein said first channel outlet is positioned in fluid communication with said timer inlet, wherein said second channel inlet is positioned in fluid communication with said timer outlet, wherein said conduit assembly includes a conduit outlet structure defining said second channel outlet, wherein said conduit outlet structure is aligned with said base outlet structure, and wherein said first channel is aligned with said inflow opening.

BRIEF DESCRIPTION OF THE FIGURES

Features of the present invention will become apparent to those skilled in the art from the following description with reference to the figures, in which.

DETAILED DESCRIPTION

For the purpose of promoting an understanding of the principles of the device described herein, reference will now be made to the embodiment(s) illustrated in the figures and described in the following written specification. It is understood that no limitation to the scope of the device is thereby intended. It is further understood that the device includes any alterations and modifications to the illustrated embodiment (s) and includes further applications of the principles of the device as would normally occur to one of ordinary skill in the art to which this device pertains.

Figure 1:
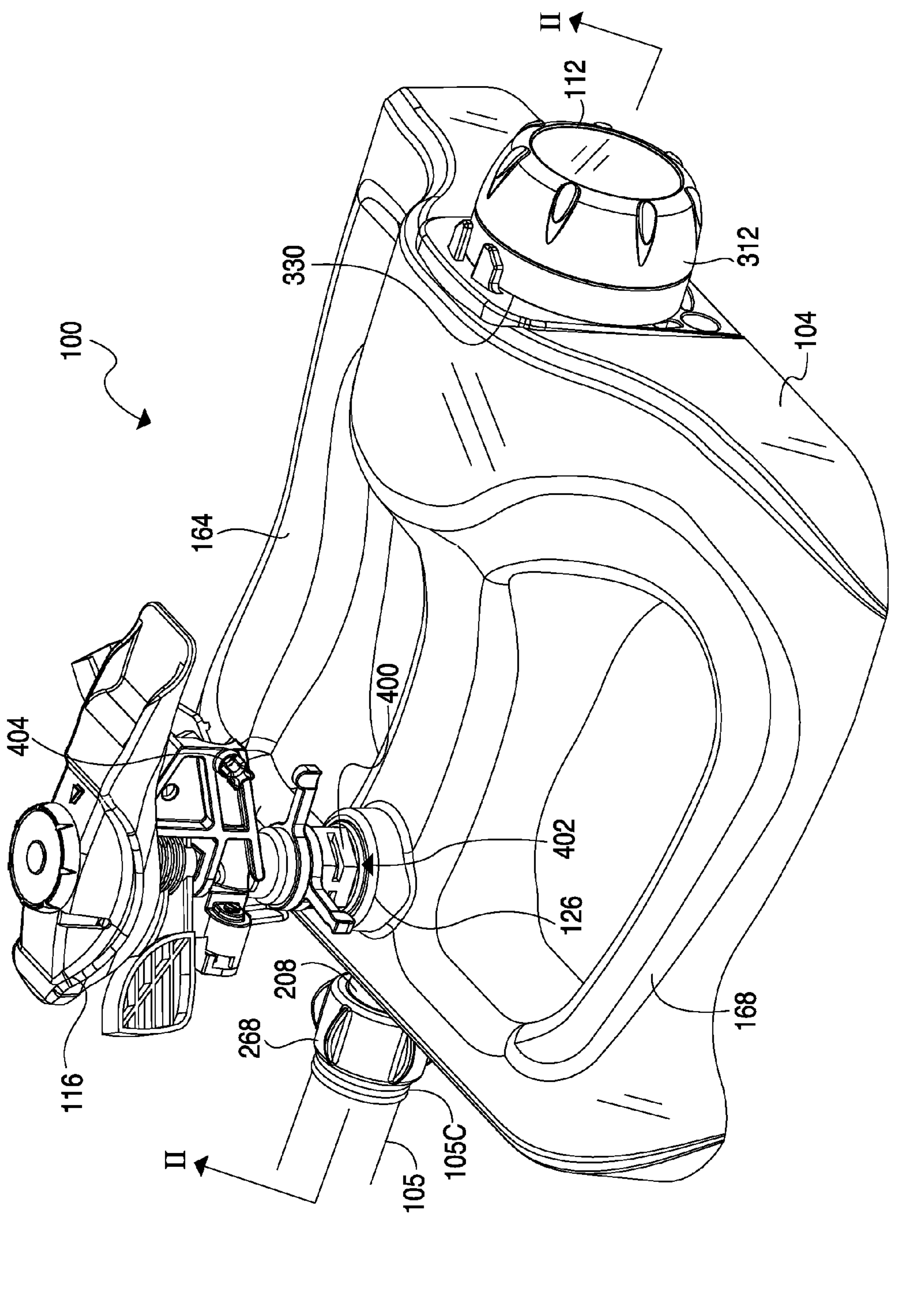
FIG. 1 is a perspective view of a water sprinkler having a conduit assembly and a timer mechanism according to the present disclosure.

A water sprinkler 100, shown in FIG. 1, distributes water within a predetermined area. The water sprinkler 100 includes a base 104, a conduit assembly 108 (FIG. 2), a timer mechanism 112, and a distributor 116. The conduit assembly 108, which is positioned on the underside of the base 104, fluidly couples a water supply conduit 105 to the timer mechanism 112. The conduit assembly 108 also fluidly couples the timer mechanism 112 to the distributor 116. In response to the timer mechanism 112 being in an "on" mode, the distributor 116 distributes water from the water supply conduit onto the predetermined area. In response to the timer mechanism 112 being in an "off" mode, the distributor 116 prevents water from being sprayed onto the predetermined area.

Figure 2:
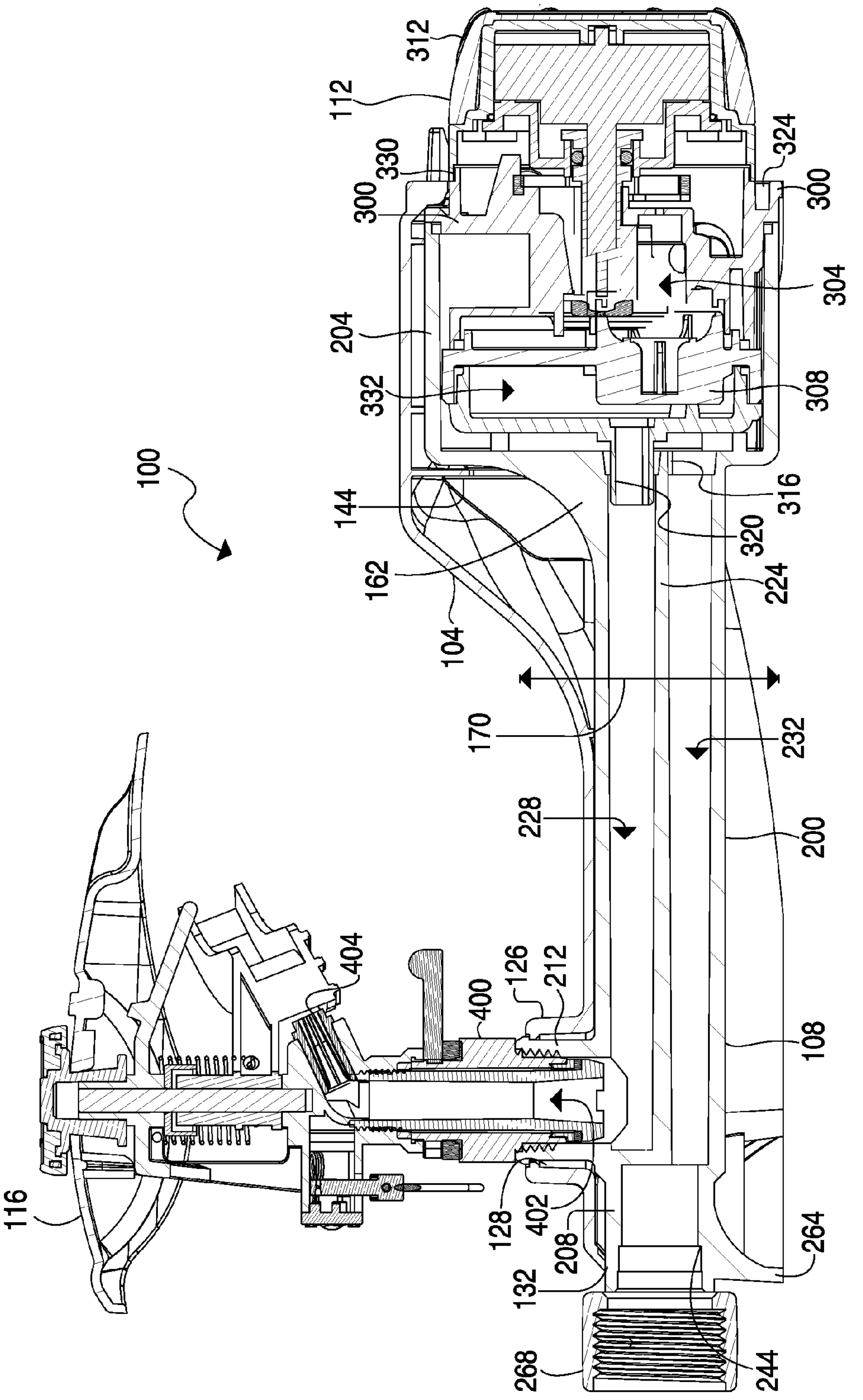
FIG. 2 is a cross sectional view of the water sprinkler of FIG. 1 taken along the line II-II of FIG. 1.
Figure 3:
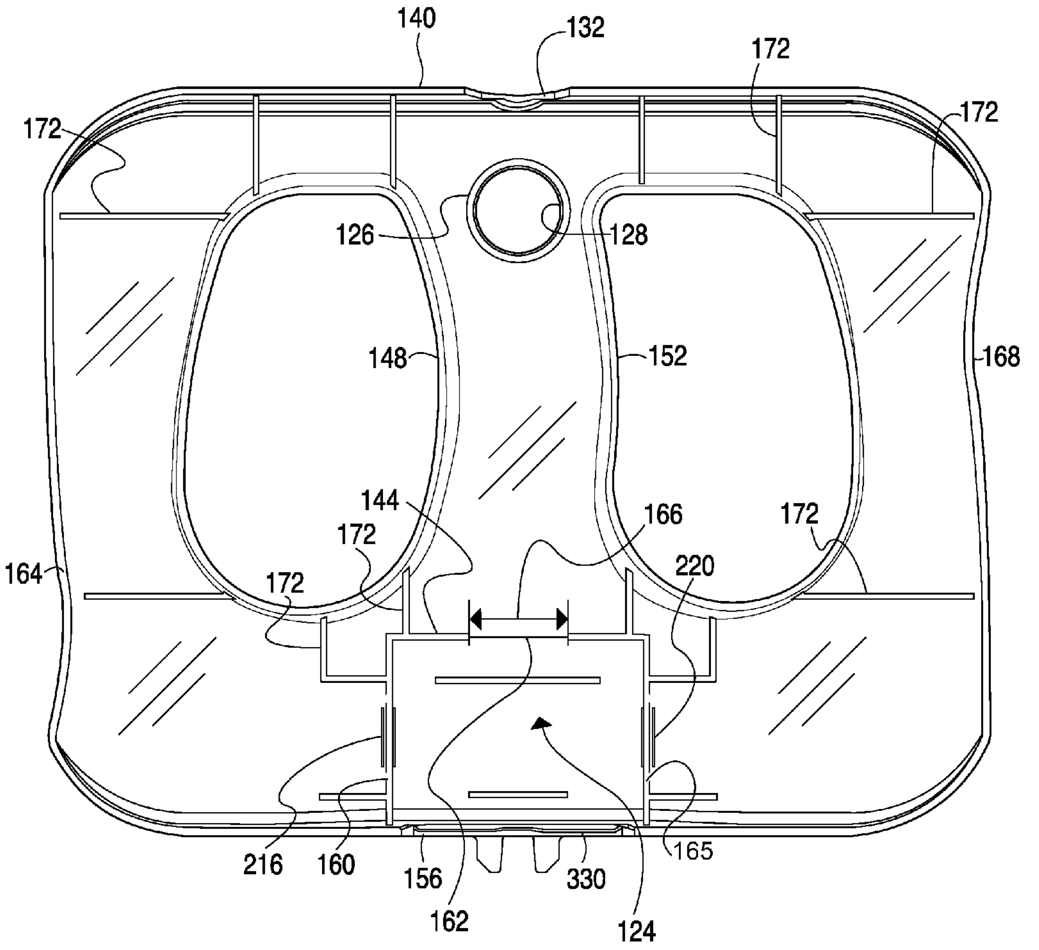
FIG. 3 is a bottom plan view of the water sprinkler of FIG. 1, with the conduit assembly and the timer mechanism removed for clarity of viewing.

The base 104 supports and positions the components of the water sprinkler 100 as shown in FIGS. 1 and 2. The base 104 is formed from an injection molded thermoplastic material. As shown in FIG. 3, the base 104 includes, among other features, a cavity 120, a cavity 124, a base outlet structure 126, and an inflow opening 132. The cavity 120 extends longitudinally from the edge 140 to a partition 144 between the cavity 120 and the cavity 124. A width of the cavity 120 generally extends from an edge 148 to an edge 152. The base defines five sides of the cavity 120. A sixth side of the cavity 120 is open (the bottom side in FIG. 2). The cavity 124 extends longitudinally from the partition 144 to an edge 156. A width of the cavity 124 extends from an edge 160 to an edge 165. The base 104 defines five sides of the cavity 124. A sixth side of the cavity 124 is open (the bottom side in FIG. 2). A passage 162 is defined in the partition 144 and allows fluid to be advanced from the cavity 120 to the cavity 124 via the conduit assembly 108. The passage 162 has a width as shown by reference line 166 of FIG. 3 and a height as shown by reference line 170 of FIG. 2.

The outlet structure 126 defines an outflow opening 128 through the base 104. As shown in FIG. 2, the outflow opening 128 is formed through a top side of the base 104. A center of the outflow opening 128 is aligned with a longitudinal center of the cavity 120, as shown in FIG. 3. The exemplary outflow opening 128 is circular; however, the outlet structure 126 may define an outflow opening 128 having a rectangular periphery or any other periphery as determined, in part, by the external periphery of the portion of the conduit assembly 108 that extends through the outflow opening 128.

The base 104 also defines an inflow opening 132 through the edge 140. A center of the inflow opening 132 is aligned with the longitudinal axis of the cavity 120, as shown in FIG. 3. The inflow opening 132 is only partially surrounded by the base 104. In particular, a bottom side of the inflow opening 132 is not surrounded by the base 104. A portion of the periphery of the inflow opening 132 matches approximately a cross section of a tube portion 200 (FIG. 4) of the conduit assembly 108.

As shown in FIGS. 1 and 3, the base 104 includes a lateral extension 164 and a lateral extension 168. The lateral extensions 164, 168, also referred to herein as handles 164, 168, may be grasped by a user to transport the water sprinkler 100. For example, the garden hose 105 is coupled to the water sprinkler 100, and a user may grasp one or more of the lateral extensions 164, 168 to move the water sprinkler 100 while the garden hose 105 remains attached to the water sprinkler 100.

As shown in FIG. 3, the base 104 includes numerous support fins 172. The fins 172 are provided to increase the rigidity of the base 104. In particular, the fins 172 ensure that the structural integrity of the base 104 is not compromised in response to the base 104 being subjected to a compressive force. Additionally, the fins 172 ensure that the structural integrity of the base 104 is not compromised in response to a force being exerted upon the handles 164, 168. For example, some users may attempt to move the water sprinkler 100 with a garden hose coupled to the water sprinkler 100. As is commonly the case, the garden hose may become caught or tangled upon an outdoor feature. The fins 172 ensure that the structural integrity of the base 104 is not compromised should a user attempt to dislodge the hose from the outdoor feature by exerting a force upon one or more of the handles 164, 168.

Figure 4:
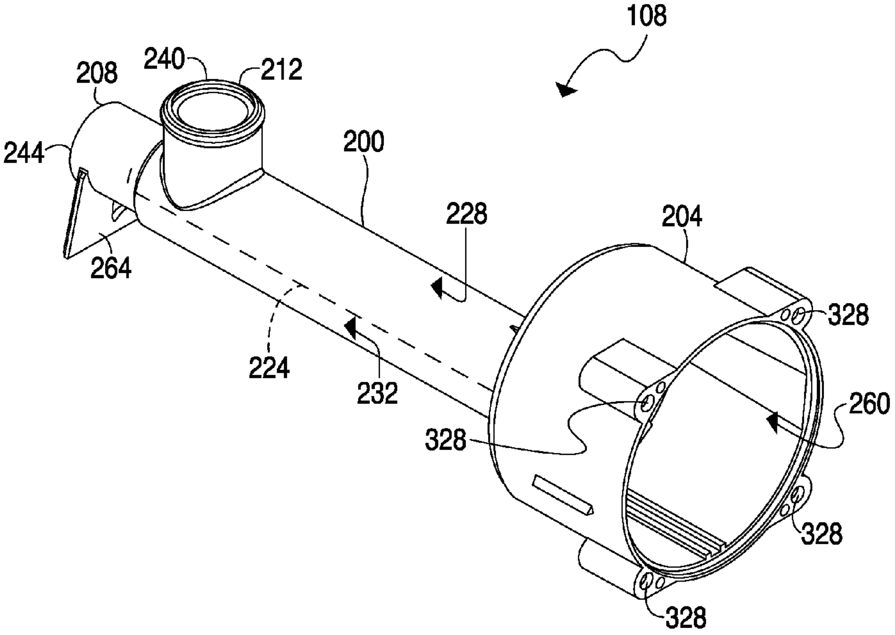
FIG. 4 is a perspective view of a conduit assembly of the water sprinkler of FIG. 1.
Figure 5:
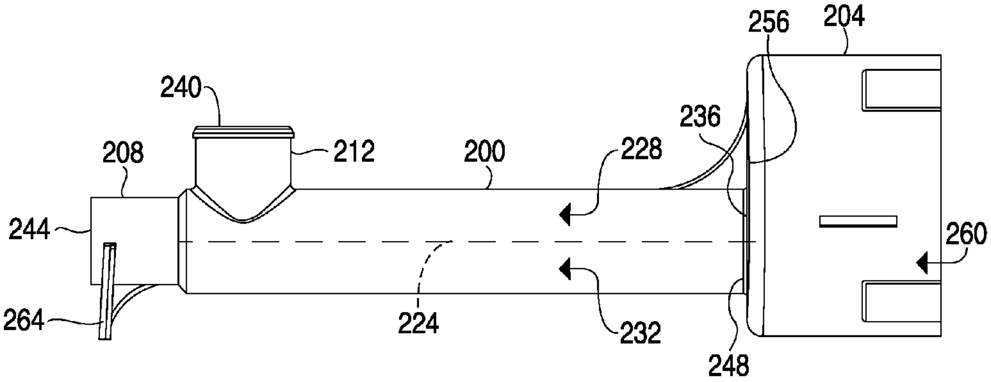
FIG. 5 is a side elevational view of the conduit assembly of FIG. 4.

With reference to FIG. 2, the conduit assembly 108 is positioned within the cavity 120 and the cavity 124. The conduit assembly 108 is formed from an injection moldable thermoplastic material. As shown in FIGS. 4 and 5, the conduit assembly 108 includes a tube portion 200, a housing 204, a conduit inlet structure 208, and a conduit outlet structure 212. The tube portion 200, housing 204, inlet structure 208, and outlet structure 212 are integrally formed as a single part. Alternatively, such components may be formed separately and then glued, fused, or otherwise joined together. The inlet structure 208 is configured to form an end of the tube portion 200, and the housing 204 is configured to form an opposite end of the tube portion 200. The conduit outlet structure 212 is configured to form an intermediate portion of the tube portion 200 that is between the inlet structure 208 and the housing 204.

As shown in FIG. 2, the tube portion 200 includes a divider 224 that separates the internal volume of the tube portion 200 into a channel 228 and a channel 232. The divider 224 (shown in phantom in FIGS. 4 and 5) extends diametrically within the internal volume of the tube portion 200. The divider 224 is an imperforate structure that fluidly decouples the channel 228 from the channel 232. The channel 232 occupies a bottom portion of the tube portion 200 and the channel 228 occupies a top portion of the tube portion 200.

As shown in FIG. 5, the channel 228 includes an inlet 236 and an outlet 240. Similarly, the channel 232 includes an inlet 244 and an outlet 248. Both the channel 228 and the channel 232 extend through the passage 162 in the partition 144, as shown in FIG. 2. Additionally, the channel 232 extends through the inflow opening 132 and is at least partially aligned with the inflow opening 132. The channel 228 is spaced apart from the inflow opening 132.

The inlet structure 208 defines the inlet 244 of the channel 232. In response to the water sprinkler 100 being coupled to a water supply, water flows into the inlet structure 208 through the inlet 244, through the channel 232, and then through the outlet 248. As described below, water exiting the outlet 248 is received by the timer mechanism 112 and then selectively fluidly coupled to the channel 228.

As shown in FIG. 2, the outlet structure 212 is positioned within the outlet structure 126 so as to be coaxial with the outlet structure 126 and the outflow opening 128 when the conduit assembly 108 is received by the base 104. The position of the outlet structure 212 on the tube portion 200 depends on, among other factors, the position of the outflow opening 128. As a result, in embodiments alternative to the one shown in FIGS. 1-7, the outlet structure 212 may be positioned at or near the middle of the tube portion 200. Alternatively, the outlet structure 212 is positioned near the housing 204. In each embodiment, the outlet structure 212 defines the outlet 240. Therefore, water flows from the inlet 236, through the channel 228, and then through the outlet structure 212 and the outflow opening 128. The outlet structure 212 includes internal threads that are configured to meshingly engage the external threads of the distributor 116.

Figure 6:
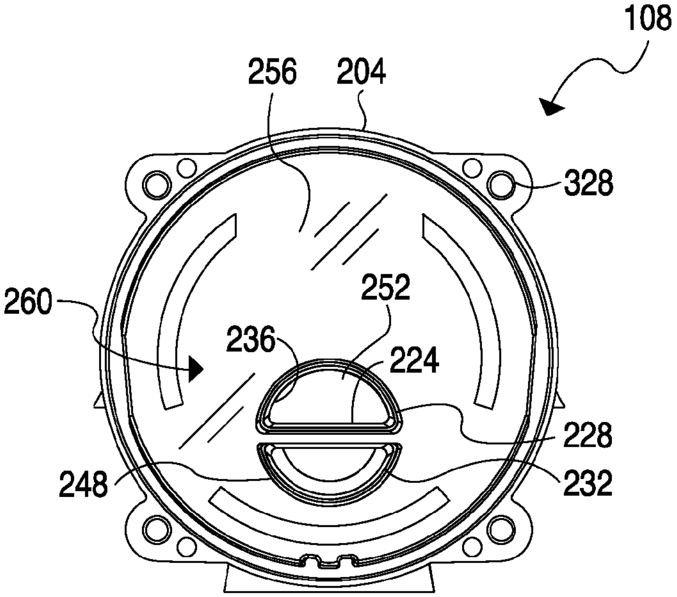
FIG. 6 is a rear elevational view of the conduit assembly of FIG. 4.

As shown in FIG. 5, the housing 204 is connected to the end of the tube portion 200 near the outlet 248 and the inlet 236. The housing 204 is received by the base 104 in the cavity 124. The chamber 260 is configured to receive the timer mechanism 112, such that the timer mechanism 112 is at least partially positioned within the chamber 260. Accordingly, the internal dimensions of the housing 204 match approximately the external dimension of the timer mechanism 112. The housing 204 includes openings 328 for receiving fastening members (not shown) configured to secure the timer mechanism 112 to the housing 204. As shown in FIG. 6, the housing 204 also includes a passageway 252 that is aligned with both the outlet 248 and the inlet 236. The passageway 252 is an opening through the surface 256 of the housing 204.

Referring again to FIG. 3, the base 104 includes an interlock 216 and an interlock 220 for securing the housing 204 the base 104. The interlocks 216, 220 are resilient members that are biased toward each other. The interlocks 216, 220 fixedly secure the housing 204 to the base 104 in response to the conduit assembly 108 being inserted into the cavity 120 and the cavity 124. The housing 204 of the conduit assembly 108 is decoupled from the base 104 by flexing the interlocks 216, 220 away from each other.

Figure 7:
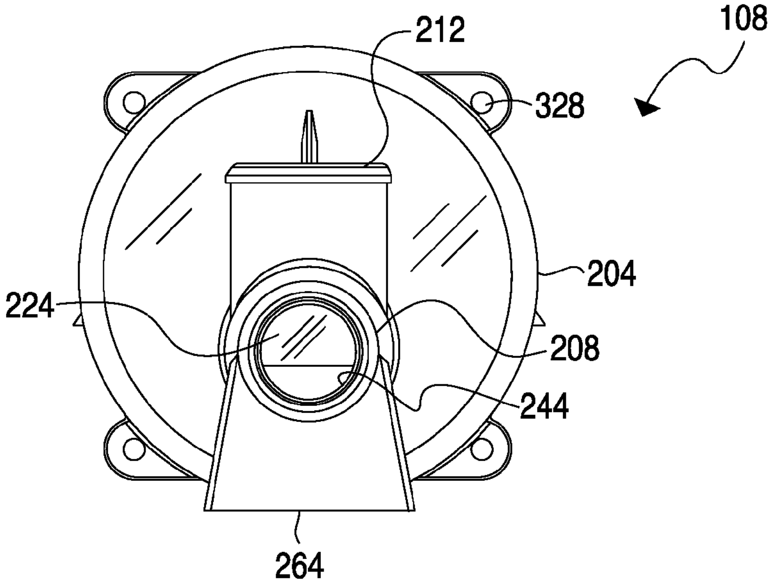
FIG. 7 is a front elevational view of the conduit assembly of FIG. 4.

The conduit assembly 108 includes a support tang 264, as shown in FIGS. 2, 4, and 7. The support tang 264 is connected to the inlet structure 208 and extends in a downward direction. When the water sprinkler 100 is placed on a surface, the support tang 264 contacts the surface to prevent the conduit assembly 108 from moving relative to the base 104 in response to a downward force being exerted upon the inlet structure 208. The support tang 264 is at least partially positioned in the inflow opening 132 of the base 104, as shown in FIG. 3.

As shown in FIGS. 1 and 2, the water sprinkler 100 includes a coupling 268. The coupling 268, which may be referred to as a hose coupling, is supported by the inlet structure 208. The coupling 268, includes internal threads that are configured to meshingly engage an externally threaded coupling 105C of the garden hose 105. Accordingly, the coupling 268 fluidly couples the garden hose 105 to the tube portion 200, and in particular couples the garden hose 105 to the channel 232. As shown in FIG. 2, the coupling 268 is in fluid communication with the inlet 244.

The timer mechanism 112 regulates the flow of water from the inlet structure 208 to the outlet structure 212. A portion of the timer mechanism 112 is received by the housing 204, and another portion of the timer mechanism 112 is positioned outside of the cavity 124, as shown in FIG. 2. The timer mechanism 112 includes a casing 300, a mechanical timer 304, a diaphragm 308, a dial 312, an input 316, and an output 320, among other components. The casing 300 is secured to the housing 204 to connect the timer mechanism 112 to the conduit assembly 108. The casing 300 includes openings 324 (only one of which is illustrated in FIG. 2) through which fasteners extend into the openings 328 of the housing 204. The fasteners connect fixedly the timer mechanism 112 to the housing 204. The dial 312, which is located outside of the cavity 124, extends through a timer opening 330 defined by the base 104.

In response to the timer mechanism 112 being connected to the housing 204, the inlet 316 is positioned in fluid communication with the outlet 248 and the outlet 320 is positioned in fluid communication with the inlet 236, as shown in FIG. 2. The inlet 316 and the outlet 320 protrude from the casing 300 such that in response to the casing 300 being inserted into the housing 204, the inlet 316 extends through the outlet 248 and into the channel 232, and the outlet 320 extends through the inlet 236 into the channel 228. The timer mechanism 112 may include a gasket that surrounds the input 316 and the output 320 to ensure that a fluid-tight junction is formed between the outlet 248 and the inlet 316 and the outlet 320 and the inlet 236. A gasket, however, is not required to form the fluid-tight junction between the outlet 248 and the inlet 316 and the outlet 320 and the inlet 236.

The timer mechanism 112 selectively fluidly couples the channel 228 to the channel 232. As described above, the timer mechanism 112 includes a mechanical timer 304 and a diaphragm 308. The diaphragm 308 is positioned in a chamber 332. The chamber 332 is fluidly coupled to the inlet 316 and the outlet 320. The mechanical timer 304 is configured to move the diaphragm 308 within the chamber 332 to couple selectively the inlet 316 to the outlet 320. In particular, the mechanical timer 304 may be configured in an "on" configuration or an "off" configuration. In the "on" configuration the mechanical timer 304 positions the diaphragm 308 to couple fluidly the channel 228 to the channel 232, thereby enabling water to flow through the inlet 316, into the chamber 332, and through the outlet 320. Accordingly, when the mechanical timer 304 is in the "on" configuration, water from the water supply flows through the inlet structure 208, through the channel 232, into the inlet 316, through the chamber 332, out the outlet 320, through the channel 228, out the outlet 240, and into the distributor 116. In the "off" configuration the mechanical timer 304 positions the diaphragm 308 to decouple fluidly the channel 228 from the channel 232, thereby preventing fluid in the channel 232 from flowing into the chamber 332. Accordingly, in response to the timer mechanism 112 being in the "off" configuration, water from the water supply is prevented from flowing into the chamber 332, the outlet 320, the channel 228, or the distributor 116. The timer mechanism 112 is not limited to the exemplary diaphragm 308 illustrated in FIG. 2. In particular, the timer mechanism 112 may be any device or apparatus that selectively couples the channel 228 to the channel 232 in response to the state of a mechanical timer.

The mechanical timer 304 remains in the "on" configuration for a predetermined time period. At the conclusion of the predetermined time period the mechanical timer 304 enters the "off" configuration. A user selects the predetermined time period by rotating the dial 312, which is rotatably coupled to the mechanical timer 304. An exemplary range of the predetermined time period is from approximately twenty minutes to three hours.

The distributor 116, also referred to as a distribution device or a sprinkler head, is coupled to the base 104 and the conduit assembly 108. In particular, the distributor 116 is connected to the outlet structure 212 through the outflow opening 128. When the water sprinkler 100 is connected to a water supply and the mechanical timer 304 is in the "on" configuration, the distributor 116 distributes water from the water supply within the predetermined area. The distributor 116 is an oscillating distributor as shown in FIG. 1, but may alternatively be a stationary or other known type of distributor.

As shown in FIG. 2, the distributor 116 includes an inlet structure 400 and outlet 404. The inlet structure 400 defines an inlet opening 402, which is in fluid communication with the outlet structure 212, the outlet 240, and the channel 228. The inlet structure 400 includes external threads configured to meshingly engage the internal threads of the outlet structure 212. When the threads of the inlet structure 400 are meshed with the threads of the outlet structure 212, a fluid tight seal is formed between the inlet structure 400 and the outlet 240. Water exiting the conduit assembly 108 through the outlet 240 is received by the inlet opening 402 and exits the distributor 116 through the outlet 404. The distributor 116 may also include a water motor configured to move the outlet 404 in response to the flow of water through the inlet opening 402.

To assemble the water sprinkler 100, the timer mechanism 112 is inserted into the housing 204, such that the inlet 316 is inserted into the outlet 248 and the outlet 320 is inserted into the inlet 236. A fluid tight seal is formed between the inlet 316 and the outlet 248 and between the outlet 320 and the inlet 236 in response to the timer mechanism 112 being inserted into the housing 204. Next, to ensure that the timer mechanism 112 remains seated within the housing 204, fasteners are inserted through the openings 324 and the openings 328. Subsequently, the conduit assembly 108, having the timer mechanism 112 mounted to the housing 204, is coupled to the base 104. In particular, the housing 204 is seated in the cavity

124 and the tube portion 200 is seated in the cavity 120 and the cavity 124. The dial 312 extends through the timer opening 330 in the base 104, as illustrated in FIGS. 1 and 2. Upon inserting the tube portion 200 into the cavity 120, the outlet structure 212 is fitted through the outflow opening 128. The interlocks 216, 220 engage the casing 300 to secure the housing 204 of the conduit assembly 108 to the base 104. Next, the coupling 268 is connected to the inlet structure 208 and the distributor 116 is threadingly coupled to the outlet structure 212.

In operation, the water sprinkler 100 distributes water from a water supply selectively over a predetermined area. To configure the water sprinkler 100 to distribute water, a water supply conduit 105, such as a garden hose, is connected to a water supply. Then, the water supply conduit 105 is fluidly coupled to the inlet structure 208. In particular, the internal threads of the coupling 268 are meshingly engaged with the external threads of the coupling 105C of the garden hose 105 to couple fluidly the garden hose 105 to the channel 232. Typically, a valve or spigot regulates the flow of water through the garden hose 105. Next, the mechanical timer 304 is set for a predetermined time period by rotating the dial 312 to select a desired time period. Setting the timer mechanism 112 for the desired time period configures the timer mechanism 112 in the "on" configuration for the duration of the time period.

After the timer mechanism 112 is configured, the spigot is positioned to enable water to flow through the garden hose 105 to the water sprinkler 100. Water from the garden hose 105 flows through the input structure 208 and is diverted by the diverter 224 into the channel 232. Next, because the timer mechanism is in the "on" configuration, water flows through the inlet 316, into the chamber 332, and then through the outlet 320. After flowing through the timer mechanism 112, the water flows through the channel 228 and the output structure 212. Water flowing through the output structure 212, flows through the inlet opening 402 and then is distributed onto the predetermined area after it exits the outlet 404. Accordingly, the water sprinkler 100 is configured such that water distributed by the distributor 116 must first pass through both the outlet 240 and the outflow opening 128, before the water is ejected from the water sprinkler 100 by the distributor 116.

At the expiration of the predetermined time period of the timer mechanism 112, the water sprinkler 100 stops distributing water provided by the water supply. In particular, at the expiration of the predetermined time period the mechanical timer 304 causes the diaphragm 308 to move to the position in which the channel 228 is fluidly decoupled from the channel 232. Accordingly, the water from the water supply enters the channel 232, but is prevented from flowing through the outlet 248 due to the position of the diaphragm 308.

The device described herein has been illustrated and described in detail in the figures and foregoing description, the same should be considered as illustrative and not restrictive in character. It is understood that only the preferred embodiments have been presented and that all changes, modifications, and further applications that come within the spirit of the device described herein are desired to be protected.

What is claimed is:

1. A water sprinkler, comprising:

a base defining a first cavity and an outflow opening;

a conduit assembly positioned in said first cavity, said conduit assembly including a tube portion having a first end and a second end and a divider configured to separate said tube portion into a first channel and a second channel, and said first channel defining a first channel inlet and a first channel outlet, and further said second channel defining a second channel inlet and a second channel outlet, wherein said first channel inlet is disposed at said first end of said tube portion and said second channel inlet is disposed at said second end of said tube portion; and a timer mechanism having a timer inlet and a timer outlet, said timer mechanism being configured to operate in (i) a first mode in which fluid is allowed to pass between said timer inlet and said timer outlet, and (ii) a second mode in which fluid is prevented from passing between said timer inlet and said timer outlet, wherein said first channel outlet is positioned in fluid communication with said timer inlet, wherein said second channel inlet is positioned in fluid communication with said timer outlet, and wherein said base and said conduit assembly are configured so that fluid advancing through the water sprinkler must pass through both (i) said second channel outlet, and (ii) said outflow opening.

2. The water sprinkler of claim 1, wherein:

said base includes a base outlet structure defining said outflow opening, said conduit assembly includes a conduit outlet structure defining said second channel outlet, and said conduit outlet structure is at least partially positioned within said base outlet structure.

3. The water sprinkler of claim 2, wherein:

said base outlet structure and said conduit outlet structure are positioned in a coaxial relationship with respect to each other.

4. The water sprinkler of claim 2, wherein said conduit outlet structure defines a set of internal threads.

5. The water sprinkler of claim 2, wherein:

said conduit outlet structure defines a set of internal threads, said fluid distribution device includes a distribution inlet structure that defines said distribution inlet, said distribution inlet structure defines a set of external threads, and said set of internal threads are meshingly engaged with said set of external threads.

6. The water sprinkler of claim 1, wherein:

said base further defines a second cavity, and said timer mechanism is at least partially positioned in said second cavity.

7. The water sprinkler of claim 6, wherein at least a portion of said timer mechanism is located outside of said second cavity.

8. The water sprinkler of claim 7, wherein:

said base further defines a timer opening, and said timer mechanism extends through said timer opening.

9. The water sprinkler of claim 1, further comprising a fluid distribution device coupled to said base, wherein:

said fluid distribution device has a distribution inlet and a distribution outlet, and said distribution inlet is positioned in fluid communication with said second channel outlet.

10. The water sprinkler of claim 1, further comprising a hose coupling supported by said conduit assembly and positioned in fluid communication with said first channel inlet.

11. A water sprinkler comprising:

a base defining a first cavity, a second cavity, and an outflow opening, a conduit assembly positioned in said first cavity and defining a first channel and a second channel, and said first channel defining a first channel inlet and a first channel outlet, and said second channel defining a second channel inlet and a second channel outlet, a timer mechanism having a timer inlet and a timer outlet, said timer mechanism being configured to operate in (i) a first mode in which fluid is allowed to pass between said timer inlet and said timer outlet, and (ii) a second mode in which fluid is prevented from passing between said timer inlet and said timer outlet, wherein said timer mechanism is at least partially positioned in said second cavity, wherein said first channel outlet is positioned in fluid communication with said timer inlet, wherein said second channel inlet is positioned in fluid communication with said timer outlet, wherein said base and said conduit assembly are configured so that fluid advancing through the water sprinkler must pass through both (i) said second channel outlet, and (ii) said outflow opening, said base includes a partition interposed between said first cavity and said second cavity, said partition defines a passage, and both said first channel and said second channel extends through said passage.

12. The water sprinkler of claim 11, wherein:

said base further defines an inflow opening, and said first channel extends through said inflow opening.

13. The water sprinkler of claim 12, wherein:

said conduit assembly includes (i) a tube structure defining said first channel and said second channel, and (ii) a support tang attached to said tube structure, and said tang is located at least partially within said inflow opening.

14. A water sprinkler comprising:

a base defining a first cavity, an inflow opening, and an outflow opening;

a conduit assembly positioned in said first cavity and defining a first channel and a second channel, and said first channel defining a first channel inlet and a first channel outlet, and further said second channel defining a second channel inlet and a second channel outlet, a timer mechanism having a timer inlet and a timer outlet, said timer mechanism being configured to operate in (i) a first mode in which fluid is allowed to pass between said timer inlet and said timer outlet, and (ii) a second mode in which fluid is prevented from passing between said timer inlet and said timer outlet, wherein said first channel outlet is positioned in fluid communication with said timer inlet and said first channel extends through said inflow opening, wherein said second channel inlet is positioned in fluid communication with said timer outlet, wherein said base and said conduit assembly are configured so that fluid advancing through the water sprinkler must pass through both (i) said second channel outlet, and (ii) said outflow opening, said conduit assembly includes (i) a tube structure defining said first channel and said second channel, and (ii) a support tang attached to said tube structure, and said tang is located at least partially within said inflow opening;

said conduit assembly further includes a housing defining a chamber, said housing is attached to said tube structure; and said timer is at least partially positioned within said chamber.

15. The water sprinkler of claim 14, wherein:

said housing defines a passageway, and said passageway is aligned with both (i) said first outlet of said first channel, and (ii) said second inlet of said second channel.

16. A water sprinkler, comprising:

a base having a base outlet structure defining an outflow opening, said base further defining an inflow opening and a timer opening;

a conduit assembly supported by said base, said conduit assembly including a first end and a second end and defining a first channel and a second channel, said first channel defining a first channel inlet disposed at said first end and a first channel outlet disposed at said second end, and said second channel defining a second channel inlet disposed at said second end and a second channel outlet disposed at said first end; and a timer mechanism extending through said timer opening and having a timer inlet and a timer outlet, said timer mechanism being configured to operate in (i) a first mode in which fluid is allowed to pass between said timer inlet and said timer outlet, and (ii) a second mode in which fluid is prevented from passing between said timer inlet and said timer outlet, wherein said first channel outlet is positioned in fluid communication with said timer inlet, wherein said second channel inlet is positioned in fluid communication with said timer outlet, wherein said conduit assembly includes a conduit outlet structure defining said second channel outlet, wherein said conduit outlet structure is positioned with respect to said base outlet structure so as to be coaxial with said base outlet structure, and wherein said first channel is aligned with said inflow opening.

17. The water sprinkler of claim 16, further comprising a fluid distribution device coupled to said base, wherein:

said fluid distribution device has a distribution inlet and a distribution outlet, and said distribution inlet is positioned in fluid communication with said second channel outlet.

18. The water sprinkler of claim 17, wherein:

said conduit outlet structure defines a set of internal threads, said fluid distribution device includes a distribution inlet structure that defines said distribution inlet, said distribution inlet structure defines a set of external threads, and said set of internal threads are meshingly engaged with said set of external threads.

19. The water sprinkler of claim 16, further comprising a hose coupling supported by said conduit assembly and positioned in fluid communication with said first channel inlet.

20. The water sprinkler of claim 16, wherein:

said conduit assembly includes (i) a tube structure defining said first channel and said second channel, and (ii) a housing attached to said tube structure, and said timer mechanism is at least partially positioned within said housing.

* * * * *